Sept. 2, 1947.  J. P. STEIN  2,426,797
LIQUID-PROOF CONTAINER
Filed Sept. 3, 1943  4 Sheets-Sheet 1
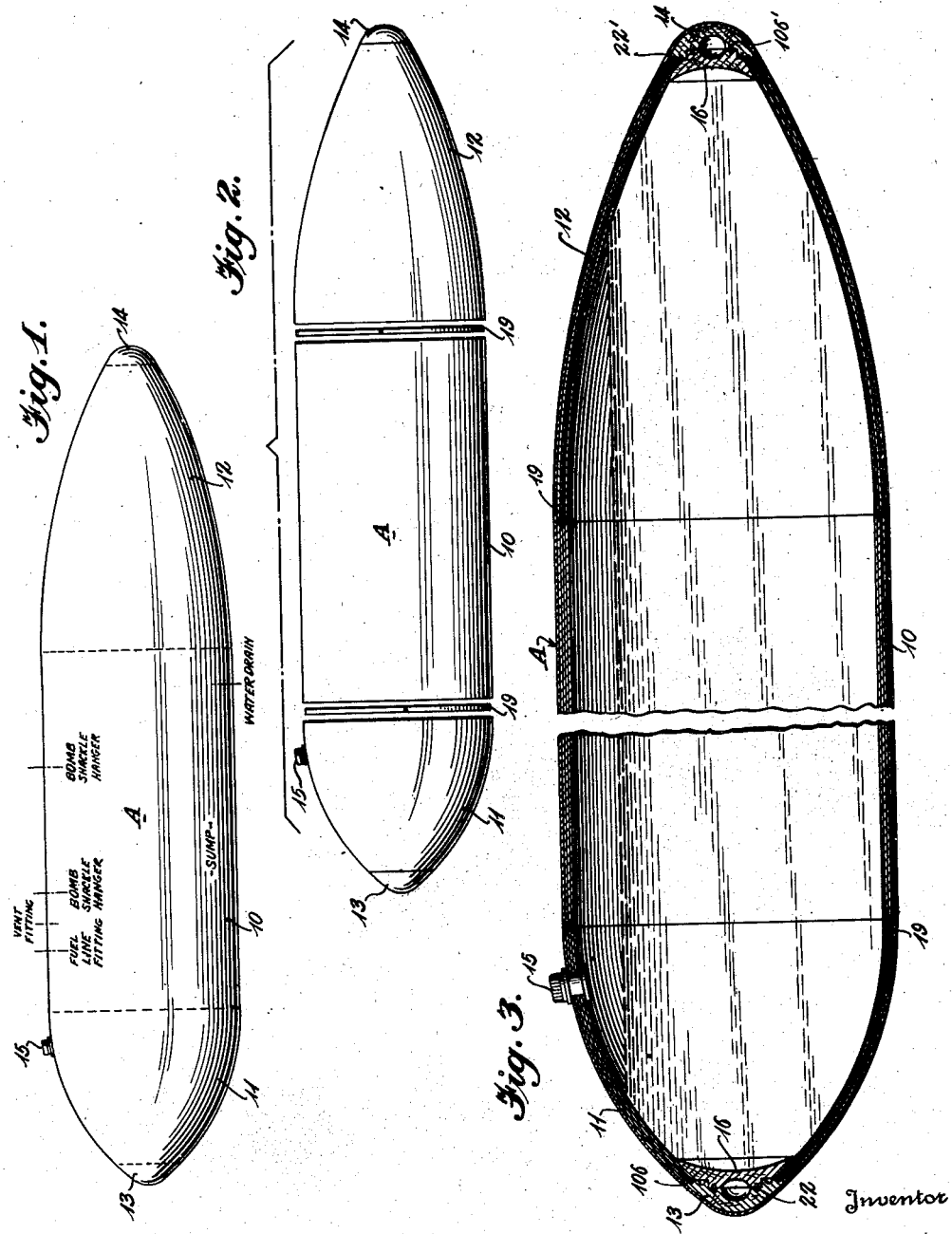
Inventor
Joseph P. Stein Sept. 2, 1947.   J. P. STEIN   2,426,797
LIQUID-PROOF CONTAINER
Filed Sept. 3, 1943   4 Sheets-Sheet 2

Inventor
Joseph P. Stein
By Munson Khare
Attorney

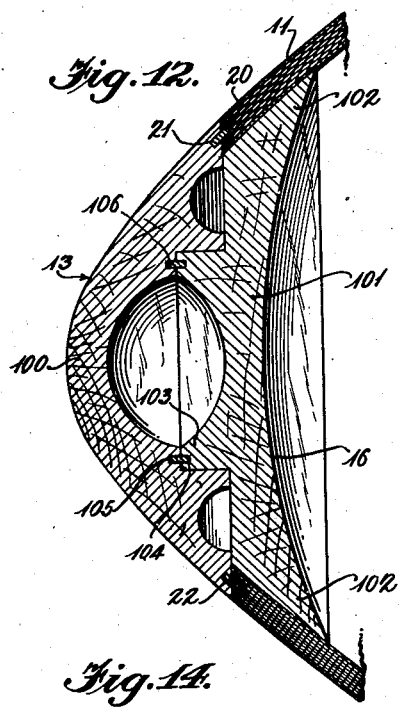
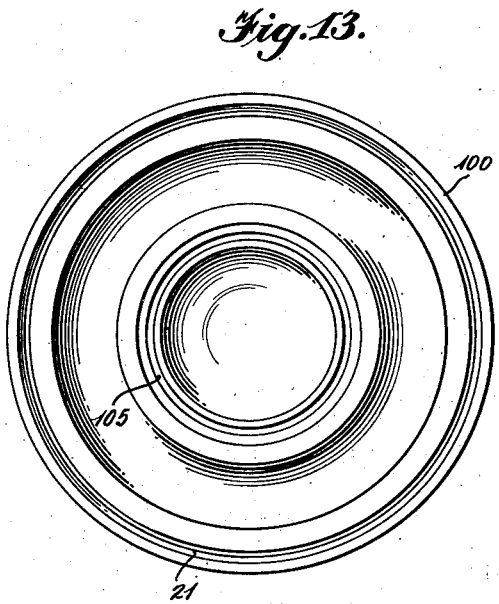
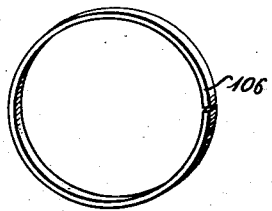
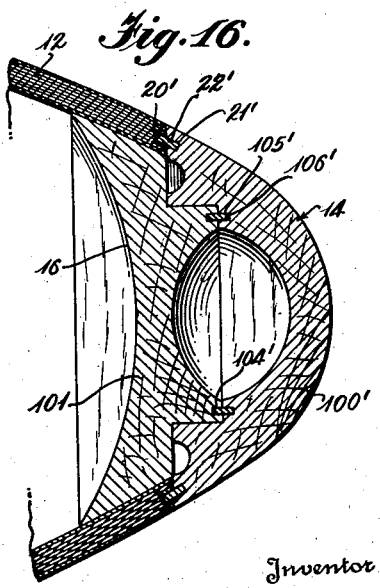
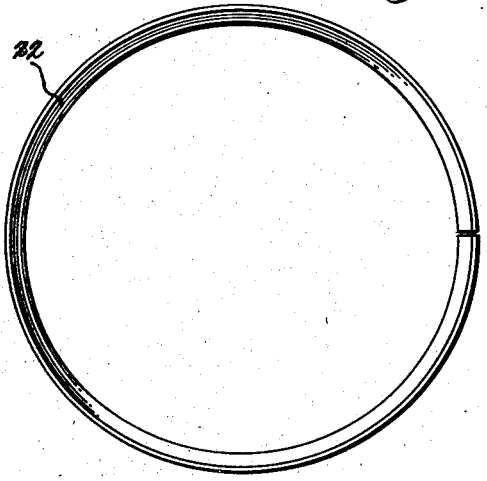

Sept. 2, 1947. J. P. STEIN 2,426,797
LIQUID-PROOF CONTAINER
Filed Sept. 3, 1943 4 Sheets-Sheet 4
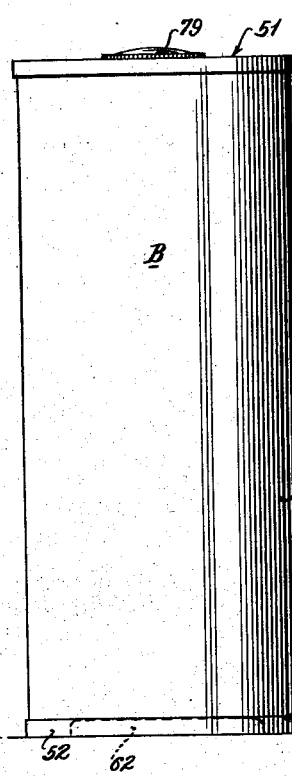
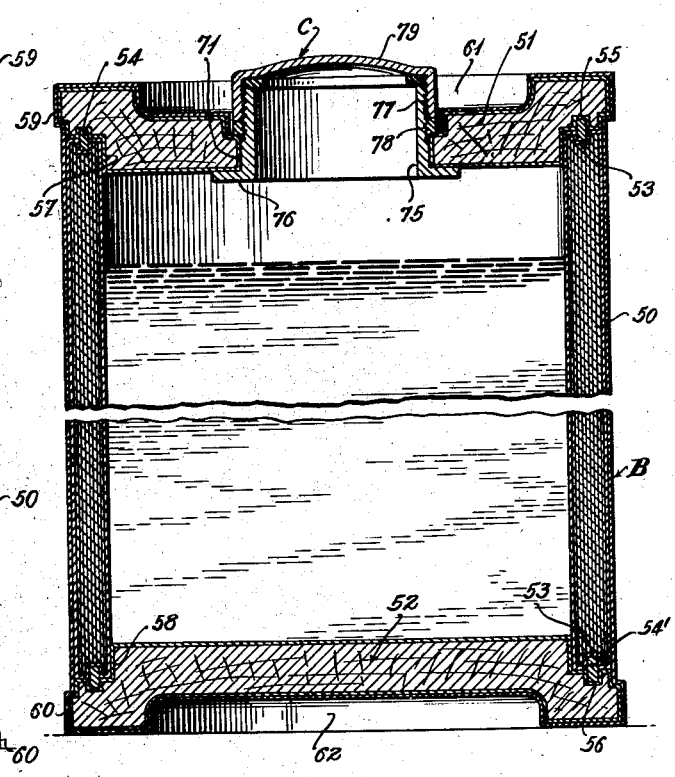
Inventor
Joseph P. Stein
By  Mmmm H Lane.
Attorney Patented Sept. 2, 1947

2,426,797

UNITED STATES PATENT OFFICE 2,426,797

LIQUIDPROOF CONTAINER

Joseph P. Stein, Los Angeles, Calif.

Application September 3, 1943, Serial No. 501,157

1 Claim. (Cl. 229—3.5)

The invention relates to liquid-proof containers which are light in weight, relatively cheap to manufacture and which do not involve the use of critical materials, such as metals and the like, which are at present difficult or impossible to obtain owing to war conditions. More particularly the invention relates to a container adapted to hold gasoline, oil or grease intended for airplane use, which container is composed principally of paper, and having end portions which may be formed of wood or the like. The container is sufficiently cheap so that when it has served its purpose it may be dropped from the plane if desired.

The invention will be more readily understood by reference to the accompanying drawings and the following detailed description, in which are set forth by way of illustration certain specific embodiments of the inventive thought.

In the drawings:

Fig. 1 is a side elevation on a reduced scale of a container embodying my invention intended for use as a fuel tank for airplanes;

Fig. 2 is an exploded view of the same showing the parts prior to assembly;

Fig. 3 is a longitudinal section on a larger scale, a portion of the cylindrical body member being broken away;

Fig. 12 is an enlarged longitudinal section showing the nose cap member, the insert plug and a portion of the end of the front tapered paper shell;

Fig. 13 is an inner face view of the nose cap;

Fig. 14 is a detail view of the ring connecting the nose cap member and insert plug;

Fig. 15 is a detail view of the ring connecting the nose cap and the tapered front end portion of the shell;

Fig. 16 is an enlarged longitudinal section similar to Fig. 12, but showing the corresponding portions of the tail cap member, insert plug and tapered rear portion of the shell;

Fig. 17 is a side elevation of a modification wherein the invention is shown applied to a grease tank or drum;

Fig. 18 is a vertical section of the same on a larger scale, portions of the shell being broken away; and Fig. 19 is an inner face view of the top of the tank or drum.

Figure 4:
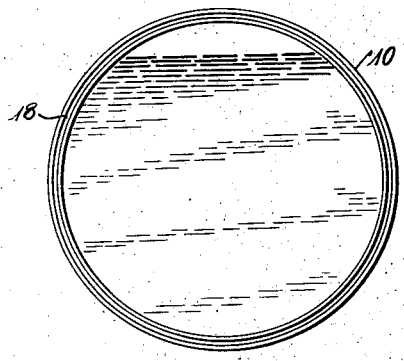
Fig. 4 is an end view of the central cylindrical section of the shell.
Figure 5:
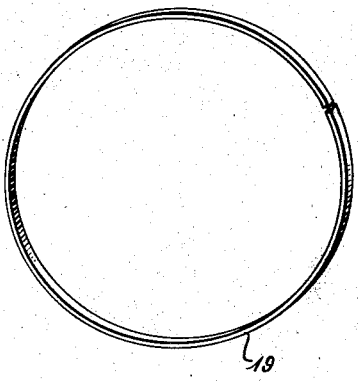
Fig. 5 is a detail view of a flexible connecting ring for connecting the cylindrical shell to an adjacent section.

Referring particularly to Figs. 1 and 2, A denotes generally a gasoline tank which is adapted for use with airplanes. The tank may be employed for carrying supplemental fuel and may be attached beneath the wings of the plane by suitable clips, such as bomb shackle hangers. The tank is light in weight, relatively cheap to manufacture, and may be dropped when empty. The container is preferably streamlined in configuration, the ends being suitably curved while the center portion is substantially cylindrical. The completed containers may be provided with various conventional fittings, such as bomb shackle hangers, fuel line clip fittings, vents, sumps, tubes and water drains. When attached to the plane the tank is preferably suspended at an angle of approximately 12° to the central axis of the fuselage, the front portion being raised and the rear being downwardly inclined so that any water which may tend to separate out will be collected at the rear end of the tank and may be drained out in any suitable manner.

As shown the container comprises a main tank portion or shell 10, cylindrical in construction and composed of paper laminations adhesively secured together and the whole being impregnated with a suitable liquid-proofing material such, for example, as cellulose acetate.

The front portion 11 and the rear portion 12 are streamlined, the front or nose portion 11 being somewhat shorter than the rear or tail portion 12. The front streamlined portion 11 is provided with an end cap 13 which may be formed of wood or like material, while the rear member 12 is provided with a similar end cap 14. As shown a gasoline filler cap 15 is included within the front section 11.

The central shell 10 is preferably cylindrical in form and is composed of a plurality of laminations of paper glued together by suitable adhesive and rendered liquid-proof by dipping or otherwise impregnating with suitable liquid-proofing material, such as cellulose esters, particularly cellulose acetate. When the impregnating material has dried the shell assumes a substantially rigid construction and may be worked with the usual wood-working tools for the production of suitable grooves at the ends thereof, which grooves, with the aid of connecting rings, are employed for securing together successive sections of the container.

While the invention is not limited to the particular dimensions of the container in question, the following dimensions are found suitable in connection with tanks adapted for use with airplanes of a certain type. In such construction the shell 10 may be 3 feet, 3½ inches long, 21 inches in diameter, and the shell wall from 3/16 to 3/8 of an inch thick. The shell may be composed of any suitable number of plies, preferably from ten to sixteen, the laminations being suitably secured together with adhesive and the whole impregnated with liquid-proofing material, such as cellulose acetate. When dry the shell is rigid, strong and durable.

The streamlined end members 11 and 12 may be similarly formed of laminated paper except for the cap portions 13 and 14, which are preferably of wood or the like. These end members 11 and 12, including the caps, may be of any suitable dimensions but when used with a shell of the dimensions described above the nose member 11 may be 1 foot, 7¼ inches in length, while the rear or tail member 12 may be 2 feet, 11 inches in length. In diameter the members 11 and 12 decrease gradually from twenty-one inches at their juncture with the shell 10 to approximately four inches at their juncture with the caps 13 and 14.

The end caps 13 and 14 may be formed of wood and, as shown, are suitably curved both externally and internally. Preferably the end caps are formed of two parts suitably joined together by connecting rings, as illustrated in Figs. 12 and 16, one part comprising an internal reinforcing plug or insert and the other part comprising an end cap member secured thereto. The plug portions are preferably internally rounded as at 16, 16 to prevent splashing of the liquid when the containers are used as fuel tanks for airplanes.

The preferred connections between successive sections of the tank will now be described. Each of the members 10, 11 and 12 is circularly grooved at its ends, and similarly the cap members 13 and 14 are provided with circular grooves. The connection between the central section 10 and the front section 11 is shown in detail in Fig. 6. A similar connection is formed between the center section 10 and the rear section 12 so that a description of one will apply to both. As shown the section 11 is provided with a circular end groove 17 which may be formed therein by turning with a wood-working tool. A similar groove 18 is formed in the end of the member 10. A flexible ring 19 having split ends is then inserted in one or the other of the grooves. The ring is similar to a piston ring and may be formed of any suitable material, such as metal or plastic. By reason of its split ends and its flexibility the ring will conform exactly to the groove in which it is inserted. The ring is preferably made slightly larger than the groove so that a forcing action is required, which slightly separates the flanges or lips of material forming the side walls of the groove. When so inserted a tight fit is insured by reason of the fact that all air has been driven out of the groove and the material on each side of the groove tightly grips the sides of the piston ring. After the ring has been inserted in one of the grooves the adjacent sections 10 and 11 are fitted together, so that one-half of the ring will fit into the groove in the companion shell member. While the application of pressure alone is sufficient to provide a substantially fluid-tight joint, nevertheless it is preferred to employ a suitable adhesive which, when dry, forms a rigid connection between the ends of successive sections and the connecting ring.

Similar connecting rings may be employed for connecting end caps 13 and 14 to the tapered paper shell sections 11 and 12. In Fig. 12 the connection between the front tapered shell section 11 and the nose cap 13 is illustrated in detail. As shown the shell section 11 is provided with an end groove 20 and the end cap 13 is provided with an end groove 21. A suitable connecting ring 22 fits in the complementary grooves 20 and 21, being preferably secured in place by suitable adhesive.

In Fig. 16 a similar connection between the tapered rear section 12 and the tail cap 14 is illustrated, with corresponding grooves 20', 21' and connecting ring 22' similar to the grooves 20, 21 and ring 22 previously described in connection with Fig. 12.

As previously indicated, and as clearly shown in Figs. 12 and 16, the end caps 13 and 14 are of two parts, an external end cap member or cap proper and a separate insert or plug fitting within the end of the adjacent tapered shell portion so as to provide suitable reinforcement therefor and also to conform with the streamlined effect of the tank.

The construction will be described first with reference to the nose portion as indicated in Fig. 12, it being understood that a similar construction is employed at the tail end as illustrated in Fig. 16. As shown the cap 13 includes a nose portion or end cap member proper 100 and an insert member or plug 101 having a curved flange 102 fitting within the end of the tapered shell portion 11 and serving to reinforce the same. The plug or insert 101 is also provided with a forwardly extending portion 103 having an end groove 104. The nose portion or end cap member 100 is also provided with a corresponding groove 105, the grooves 104 and 105 being adapted to receive between them a flexible connecting ring 106 similar to the connecting rings previously described. The insert member 101 includes the curved interior 16 which is adapted to prevent splashing, as previously described.

The tail portion of the shell is similarly formed, as illustrated in Fig. 16, the end cap being made up of two portions 100' and 101' correspondingly grooved at 104' and 105' to receive the connecting ring 106'.

The meeting portions of the end caps may be partially hollowed out for the purpose of reducing the weight thereof.

After the various sections have been assembled, and before the adhesive has fully set, a considerable degree of pressure may be applied to the ends, thus insuring a tight joint. It has been found that even where no adhesive is employed it is practically impossible to separate the sections after pressure has been applied. Where an adhesive is employed the tank becomes substantially homogeneous after the adhesive has set, so that the tank is in effect of one-piece construction. Preferably a suitable lacquer is applied over the entire container so that the joints between sections are no longer visible.

Figure 6:
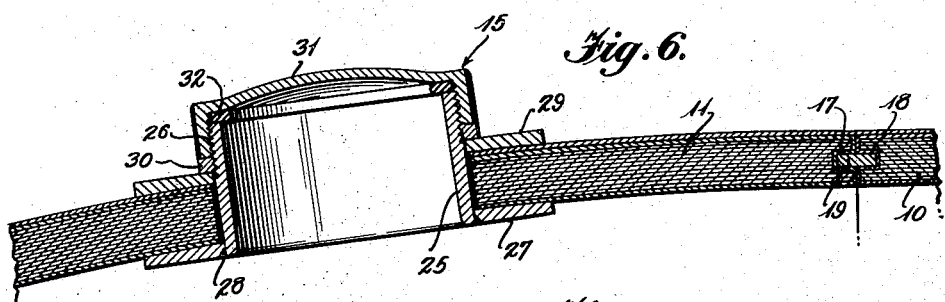
Fig. 6 is an enlarged section of a portion of the tank including the filler cap and showing the connection between the tapered front section and the central cylindrical section of the shell.
Figure 7:
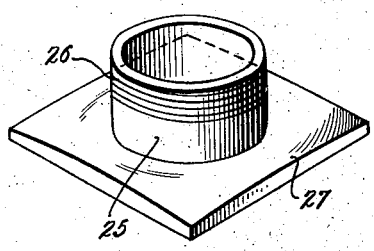
Figs. 7, 8, 9, 10 and 11 are detail views of the filler cap.
Figure 9:
Figure 10:
Figure 11:
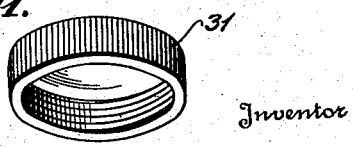
Figure 8:
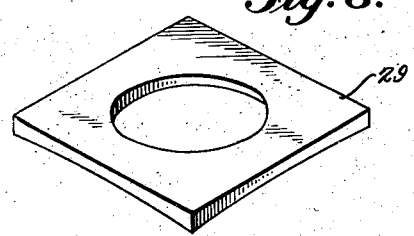

The attachment of the filler cap fitting 15 to the end section 11 is shown in Fig. 6, and details of the fitting are illustrated in Figs. 7 to 11, inclusive. It will be apparent that this fitting will be applied before the sections are assembled. The fitting comprises a tube 25 having external threads 26 and a flange portion 27. The tube is passed outwardly through an opening in the wall of the section 11, the flange 27 fitting snugly against the interior of the wall. The flange 27 may either be integral with tube 25 or may be secured thereto by brazing or welding at 28. The threaded portion of the tube extends through the wall of the section 11 to the exterior thereof and a washer 29 of metal or other material may be fitted over the tube in contact with the outer surface of the shell 11. A lock-nut 30 is then screwed over the threaded portion 25 of the tube, thus holding the fitting tightly in place. Any suitable cap 31 may be employed, being preferably provided with an internal pressure ring 32 of cork, composition, or other compressible material having acid-proof and gasoline-proof qualities.

Other fittings which are necessary or desirable to adapt the container for use as a fuel tank for airplanes may be applied to the shell either before or after assembly.

In Figs. 17 to 19 a modification of the invention is shown wherein a container is adapted for use as an oil or grease tank or drum.

The tank generally represented by the reference character B is shown as of generally cylindrical form and may be made to contain any desired quantity of oil or grease, as for example from fifteen to fifty gallons. The completed tank is strong and rigid and will withstand rough usage. It is relatively inexpensive in construction, and being light in weight is adapted for use with airplanes or any other purpose. As shown the tank comprises a cylindrical body portion 50 which may correspond with the central shell 10 of the gasoline tank A shown in Fig. 1, being preferably similarly formed of paper laminations adhesively secured together and impregnated with liquid-proofing material which is also preferably fireproof. To the cylindrical body portion 50 are secured a top portion 51 and a bottom portion 52, each being preferably formed of wood or the like material. The body portion is provided with circular grooves 53, 53 at opposite ends thereof adapted to receive connecting rings 54 and 54' which may be similar to the flexible connecting rings 19 described in the first embodiment of the invention. The end members 51 and 52 are similarly provided with circular grooves 55 and 56 respectively. When the parts are assembled by use of the connecting rings and suitable end pressure is applied so that all air is forced out of the grooves 53, 55 and 56, a fluid-tight connection is insured. The rings 54, 54' will be tightly gripped by the walls of the grooves which have been forced slightly apart owing to the somewhat larger size of the connecting ring. Even where no adhesive is employed a substantially one-piece construction is obtained, and where, in addition, a strong adhesive is likewise employed, it becomes impossible to separate the sections after the adhesive has set. When completed the entire drum is preferably coated with a suitable lacquer or other coating providing a smooth exterior and completely filling all joints.

Preferably the end members 51 and 52 are provided with internally projecting flanges 57 and 58, which likewise serve to increase the sealing qualities of the joint. The bottom member 52 may be recessed externally as at 62.

If desired the end members 51 and 52 may be provided with external flanges 59 and 60, which serve to raise the drum from the floor when the drum is overturned either for storage or transportation purposes. In such case the center portion 50 is raised slightly from the floor, thus facilitating the rolling of the drum and likewise preventing contact of the central portion with the floor or other surface.

The top 51 is shown as provided with a filler cap C which fits into a recessed opening 71 in the top of the drum. The diameter of the cap 2 is preferably about one-third that of the drum. In construction the filler cap may be similar to the gasoline filler 15 shown in the first embodiment of the invention, although of much larger size. As shown the cap includes a tubular member 75 having an internal flange 76 either integral therewith or secured thereto. The tubular member is threaded at 77, the threaded portion extending into a recessed portion in the top of the cap. The purpose of this recess is to permit application of a lock ring 78 which is screwed down over the threads 77 and serves to hold the fitting in place. A suitable closure cap 79 fits over the projecting threaded portion of the tubular member, such cap being preferably provided with a compressible ring 80 of cork, composition, or other acid-proof and gasoline-proof material.

Two specific applications of the invention have been described in detail but it will be obvious that broad features of the invention are applicable to numerous other purposes. Among the distinctive features of the invention are the central shell of paper or the like recessed at its ends and connected to end sections by flexible expansible rings of metal, plastic, or other suitable material.

The invention has been described in detail for the purpose of illustration but it will be obvious that numerous modifications and variations may be resorted to without departing from the spirit of the invention.

I claim:

A tank having a tapered shell member of circular cross section formed of impregnated paper material, a rounded end cap fitting the reduced end of the tapered section, said cap and tapered shell member having complementary grooves formed in the ends thereof, an expansible sealing ring snugly fitting in said grooves, and an internal reinforcing plug fitting within the end of the shell having a curved flange portion coacting with the interior of the shell, and having a projecting portion coacting with the end cap, said plug and cap having complementary end grooves, and an expansible sealing ring fitting in said grooves.

JOSEPH P. STEIN.

REFERENCES CITED

The following references are of record in the file of this patent:

UNITED STATES PATENTS

| Number | Name | Date |
| --- | --- | --- |
| 2,206,406 | Koch | July 2, 1940 |
| 2,320,764 | Ullrich | June 1, 1943 |
| 2,309,341 | Canden | Jan. 26, 1943 |
| 1,682,179 | Krembs | Aug. 28, 1928 |
| 2,350,271 | Braloff | May 30, 1944 |
| 1,995,703 | Clark | Mar. 26, 1935 |
| 2,230,987 | Karl | Feb. 4, 1941 |
| 1,355,976 | Howlett | Oct. 19, 1920 |